United States Patent

[11] 3,608,082

[72] Inventor  Gunnar Sigurd Redin
               New City, N.Y.
[21] Appl. No. 835,799
[22] Filed     June 23, 1969
[45] Patented  Sept. 21, 1971
[73] Assignee  American Cyanamid Company
               Stamford, Conn.

[54] METHOD OF TREATING FUNGUS INFECTIONS WITH 2-AMINO-5-(1-METHYL-5-NITRO-2-IMIDAZOLYL)-1,3,4-OXADIAZOLE
2 Claims, No Drawings

[52] U.S. Cl. .................................................. 424/272
[51] Int. Cl. ............................................. A61k 27/00
[50] Field of Search ........................................ 424/272

[56] References Cited
UNITED STATES PATENTS
3,452,035  6/1969  Berkelhammer et al...... 424/272

*Primary Examiner*—Jerome D. Goldberg
*Attorney*—Ernest Y. Miller

ABSTRACT: The method of use and compositions containing 2-amino-5-(1-methyl-5-nitro-2-imidazoles)-1,3,4-oxadiazoles in warmblooded animals, is described. This compound is useful as an antifungal agent.

METHOD OF TREATING FUNGUS INFECTIONS WITH 2-AMINO-5-(1-METHYL-5-NITRO-2-IMIDAZOLYL)-1,3,4-OXADIAZOLE

DESCRIPTION OF THE INVENTION

This invention relates to the use of 2-amino-5-(1-methyl-5-nitro-2-imidazolyl)-1,3,4-oxadiazole in warmblooded animals as an antifungal agent.

The latter compound has the following structure:

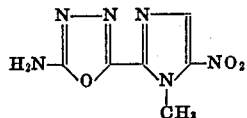

The above compound is a yellow crystalline substance melting at about 290° C. (dec.) which is soluble in boiling dimethylformamide.

The present active component can be prepared by methods described in the examples hereinafter.

The active component of the present invention has in vivo antifungal activity when tested against a *Cryptococcus neoformans* infection in mice. In this test, a lethal systemic *Cryptococcus neoformans* infection was produced by intravenous injection (0.2 ml. of a 1:10 or a 1:20 trypticase soy broth dilution from a 24-hour culture grown in trypticase soy broth on a rotary shaker at 30° C.) into Carworth Farms CF1-S white female mice. The compound to be tested was suspended and diluted in 0.2 percent aqueous agar and dosed orally or subcutaneously in a 0.5 ml. single dose within an hour after infection. Groups of infected untreated mice were used as controls to show the lethality of the infection. Tables I and II, show pooled results, expressed as percent survivors on the 7th day after infection, of several tests run according to the above-described procedure.

Table I

Subcutaneous Activity of 2-amino-5-(1-methyl-5-nitro-2-imidazolyl)-1,3,4-oxadiazole in mice infected with Cryptococcus neoformans

| Subcutaneous dose, mg./kg. | Alive/total mice, 7 days after infection (%) |
|---|---|
| 800 | 16/20 (80) |
| 400 | 16/30 (53) |
| 200 | 9/30 (30) |
| 100 | 7/30 (23) |
| 50 | 1/10 (10) |
| Infected, nontreated controls | 6/60 (10) |

Table II

Oral Activity of 2-amino-5-(1-methyl-5-nitro-2-imidazolyl)-1,3,4-oxadiazole in mice infected with Cryptococcus neoformans

| Single oral dose, mg./kg. | Alive/total mice, 7 days after infection |
|---|---|
| 1,600 | 9/10 |
| 800 | 8/10 |
| 400 | 1/10 |
| 200 | 0/10 |

Infected, nontreated controls: 30/30 mice died within 7 days after initiation of infection.

The above activity is unexpected since a number of closely related imidazolyl-oxadiazoles when tested in a similar manner showed no activity as antifungal agents.

The active component of the present invention is active in warmblooded animals at a dose of from 0.1 gram to 2 grams per kilogram. The preferred dosage range however, is from 0.4 grams to 1.6 grams per kilogram of warmblooded animal. The active component may be administered in a pharmaceutically acceptable carrier once per day or in multiple smaller doses per day.

DETAILED DESCRIPTION

The following examples describe the preparation of the active component and formulations for administration of the 2-amino-5-(1-methyl-5-nitro-2-imidazolyl)-1,3,4-oxadiazole.

EXAMPLE 1

Preparation of 2-Amino-5-(1-methyl-5-nitro-2-imidazolyl)-1,3,4-oxadiazole

Method A

In 180 ml. of hot water, 9.3 grams (0.06 mole) of 1-methyl-5-nitro-2-imidazolecarboxaldehyde is slurried while 6.7 grams (0.06 mole) of semicarbazide hydrochloride is added portionwise. After 15 minutes of heating, the mixture is cooled in a refrigerator overnight. The solid is then collected and washed with water and methanol, respectively, to give a yellow product, melting point 272°–273° C. (dec.). After drying at 100° C. for 2 hours under reduced pressure, 11.94 grams of 1-methyl-5-nitro-2-imidazolecarboxaldehyde semicarbazone is obtained. This semicarbazone (6.35 grams or 0.03 mole) is added to 10 grams of anhydrous sodium acetate in 50 ml. of glacial acetic acid and 1.25 ml. of bromine is added with continuous stirring. The mixture is heated gradually to give a nearly clear red solution at 50° C. which becomes increasingly turbid with time. After heating at 75°±3° C. for 3 hours, the mixture is cooled and poured on ice. The yellow solid is collected, washed with water, then with methanol, and dried under reduced pressure at 70° C. for 3 hours to give 5 grams of crude 2-amino-5-(1-methyl-5-nitro-2-imidazolyl)-1,3,4-oxadiazole, melting point 284°–287° C. This material is dissolved in boiling dimethylformamide, ethanol added, and the mixture cooled to give yellow crystals, melting point 291°–293° C. (dec.).

Method B

In 25 ml. of methanol, 0.93 grams (5 moles) of 1-methyl-5-nitro-2-imidazolecarboxylic acid hydrazide and 0.53 grams (5 mmole) of cyanogen bromide are refluxed for 2 hours, cooled, and poured on ice to give a pale yellow solid. This solid is collected, washed with water, and dried under reduced pressure at 100° C. for 2 hours to give 0.65 grams, melting point 286°–288° C. (dec.), of 2-amino-5-(1-methyl-5-nitro-2-imidazolyl)-1,3,4-oxadiazole. Further purification produced a compound melting at about 290° C. with decomposition.

EXAMPLE 2

The compound of this invention may be administered as hard or soft shell capsules. A useful formulation for preparing such capsules is as follows:

| | |
|---|---|
| 2-Amino-5-(1-methyl-5-nitro-2-imidazolyl)-1,3,4-oxadiazole | 20.0 grams |
| Magnesium stearate | 0.125 |
| * | grams |

Mix thoroughly, and dispense as 50 capsules. Each capsule contains 0.4 grams of active component.

EXAMPLE 3

The compound of this invention may be administered as pharmaceutical tablets. A useful formulation for preparing tablets is as follows:

| | |
|---|---|
| 2-Amino-5-(1-methyl-5-nitro-2-imidazolyl)-1,3,4-oxadiazole | 100.0 g. |
| Corn Starch | 4.0 g. |
| Methylcellulose (viscosity 400 cp.s.) | 1.0 g. |
| Magnesium stearate 1% | 1.050 g. |

Mix thoroughly and compress into 100 tablets. Each tablet contains 1.0 g. of active component.

I claim:

1. A method of treating fungus infections in warmblooded animals which comprises administering to animals suffering from fungus infections an antifungally effective amount of 2-amino-5-(1-methyl-5-nitro-2-imidazolyl)-1,3,4-oxadiazole.

2. A method in accordance with claim 1, wherein 0.1 gram to 2 grams per kilogram of 2-amino-5-(1-methyl-5-nitro-2-imidazolyl)-1,3,4-oxadiazole is administered.